Patented Oct. 30, 1945

2,387,842

UNITED STATES PATENT OFFICE 2,387,842

HEXIDE DIESTERS

Sol Soltzberg, Wilmington, Del., assignor to Atlas Powder Company, Wilmington, Del., a corporation of Delaware No Drawing. Application October 5, 1944,
Serial No. 557,387

11 Claims. (Cl. 260—345)

The present invention relates to a new class of esters, and more particularly, to the hexide simple and mixed diesters of certain fatty acids.

The hexides have the empirical formula $C_6H_{10}O_4$ with two oxygen-containing rings and two esterifiable hydroxyl groups. Their structure can be illustrated by the probable structural formula of one of the hexides:

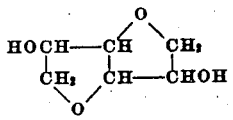

Practically, the hexides are derived from hexitols, by an anhydridizing reaction, in consequence of which the hexides are named by reference to the hexitols from which they can be formed, by changing the suffix itol to ide. Thus, mannitol yields mannide, sorbitol yields sorbide, dulcitol yields dulcide, etc. Each of the hexitols is capable of forming a number of isomeric hexides. In this application the terms "mannide," "sorbide," etc., are employed in the generic sense to cover all isomeric hexides formed from the respective hexitols.

The class of esters of this invention can be described by the formula

wherein
H is the divalent hexide residue ($C_6H_8O_4$)
$R^1$ is the acyl radical of a saturated fatty acid with from 2 to 9 carbon atoms,
$R^2$ is the acyl radical of a saturated fatty acid with from 3 to 10 carbon atoms, and
The sum of the carbon atoms in $R^1+R^2$ is at least 5 and not greater than 18.

The esters in this group are high boiling compounds with low volatilities, low water solubilities, good resistance to hydrolysis, high compatibilities and plasticizing effect on a number of plastics. They are oily liquids that can readily be incorporated into plastic formulations to prepare lacquers, films, molded articles and the like.

The fatty acids that can be used are the straight and branched chain saturated fatty acids with 2 to 10 carbon atoms, such as acetic, propionic, butyric, isobutyric, valeric, isovaleric, caproic, 2-ethylbutyric, heptoic, caprylic, 2-ethyl hexoic, pelargonic, and capric. Anhydrides, such as acetic or propionic anhydride, can be used in preparing the esters.

The esters of the invention can be prepared by reacting the hexide with at least two equivalents of the fatty acid or acid anhydride in the presence of an esterifying catalyst, such as sulfuric acid, and/or by refluxing with a water-removing liquid. Alternatively the esters can be prepared by reacting two equivalents of the acid with a hexitol or a hexitan at elevated temperature in the presence of a catalyst such as sulfuric acid, for a time sufficient to remove water from the hexitol or hexitan to form the hexide and simultaneously cause esterification with the fatty acid. Other methods of preparation can be used but these two types are preferred.

Where mixed esters, for example sorbide octoate-propionate, are to be made, it is preferable to form the mono-ester of the longer chain acid first and then complete the esterification with the shorter chain acid.

The esters of the invention are useful as solvents, extractants, blending agents for perfumes and flavors, solvent plasticizers or softeners for a number of cellulose derivatives and natural and synthetic resins. Many of the esters are plasticizers or softeners for cellulose acetate, polyvinyl chloride, polyvinyl chloride-acetate copolymer, polyvinyl butyral, synthetic rubber compositions such as butadiene-acrylonitrile copolymer, and butadiene-styrene copolymer. The esters can also be combined with extender plasticizers in a wide range of plastics and resins. In general the esters of this class have very good light stability so that plastics in which they are employed retain their tensile strength and elongation properties after long exposure to light.

One of the advantages of the esters of this invention is their lack of toxicity in food packaging and the like. For example resinous coatings for food packages can safely include these esters as plasticizers, and plastic films for food wrapping can likewise include these esters.

The following examples are illustrative of typical preparations of the esters of the invention.

EXAMPLE I

Isomannide dibutyrate 146 grams crystalline isomannide, 190 grams butyric acid, 150 ml. toluene, and 0.5 ml. concentrated sulfuric acid were heated together with continuous agitation. The water formed was removed as a constant boiling mixture with the toluene. Reaction was continued until no further evolution of water was noted at which time 35.5 ml. of water had been collected (calculated 36 ml, water).

The reaction product was then washed with sodium carbonate solution until the excess acid was removed, followed by a water wash to remove the sodium carbonate.

After evaporating the toluene under vacuum 256 grams of product were obtained having a hydroxyl number of 0 and a saponification value of 355.

This product was 100% compatible with cellulose acetate, polyvinyl acetate, polyvinyl chloride, polyvinyl chloride-acetate, and polyvinyl butyral. In a volatility test it had a weight loss of 9% after being held for 120 hours at 105° C.

EXAMPLE II

Sorbide caprylate-propionate

Sorbide was prepared by heating 1334 grams of sorbitol solution containing 31.8% water, at 140° C. with 19 grams concentrated sulfuric acid at a pressure of 88 to 92 mm. of mercury until substantially two mols of water per mol of sorbitol were removed. The product was essentially a mixture of isomeric sorbides containing 2.3% water. This product was used without neutralizing the catalyst in the following esterification reaction.

150 grams sorbide, 157 grams caprylic acid and 150 ml. toluene were heated together with agitation. The water formed was removed as a constant boiling mixture with toluene. After 24 ml. water had been collected (by separation from toluene), 90 grams propionic acid were added and reaction continued to completion.

After removal of the toluene 295 grams of product remained as an oily liquid ester, nearly insoluble in water.

EXAMPLE III

Sorbide di-2-ethyl butyrate

Sorbide was prepared by heating 2500 grams of sorbitol solution containing 30.5% water at 140° C. with 36.5 grams concentrated sulfuric acid at a pressure of 90–95 mm. of mercury until substantially two mols of water per mol of sorbitol were removed. The product was essentially a mixture of isomeric sorbides containing 2.53% water. This product was used without neutralization of the catalyst in the following esterification reaction.

225 grams sorbide, 365 grams 2-ethylbutyric acid and 150 ml. toluene were heated together with agitation. The water formed in the reaction was removed as a constant boiling mixture with toluene.

After removing the toluene there remained 461 grams of product which was an oily liquid with a viscosity of 67 centipoises at 25° C. The ester had a bitter taste. 100 grams of water at 25° C. dissolve only 0.2 gram of ester.

EXAMPLE IV

Sorbide di-caprylate 150 grams sorbide (prepared as in Example III), 315 grams caprylic acid and 150 ml. toluene were heated together with agitation. The water formed in the reaction was removed as a constant boiling mixture with toluene.

After removing the toluene there remained 388 grams of product which was an oily liquid with a viscosity of 52 centipoises at 25° C. This ester had a bitter-fatty taste. 100 grams of water at 25° C. dissolve less than 0.1 gram of the ester.

EXAMPLE V

Sorbide di-butyrate 375 grams crystalline sorbitol, 370 grams butyric acid, 1 ml. concentrated sulfuric acid and 200 ml. toluene were heated together with agitation. The water formed in the reaction was removed as a constant boiling mixture with toluene.

After removing the toluene there remained 415 grams of product which was an oily liquid. The ester had a bitter, slightly sour taste. 100 grams of water at 25° C. dissolve 0.4 gram of the ester.

The other esters of the invention can be made by similar processes using the selected acid or acids and hexide, hexitol or hexitan. Further esters that can be made by these processes are, for example, sorbide acetate-propionate, sorbide di-propionate, sorbide di-caproate (di-hexoate), sorbide di-2-ethyl hexoate, mannide decoate propionate, sorbide caproate propionate, sorbide dipelargonate, etc.

As before mentioned, the esters of the invention are plasticizers for the polyvinyl resins. Films of polyvinyl chloride, polyvinyl chloride-acetate, and polyvinyl butyral, plasticized with the esters of the invention were prepared and tested as follows:

EXAMPLE A

A stock solution was prepared of polyvinyl chloride ("Vinylite" grade "QYNA" of Carbide and Carbon Chemicals Corporation) 5 parts by weight in 95 parts of mesityl oxide. Tests were made by dissolving 0.83 part of the ester to be tested in 50 parts of the stock solution. The resulting solution was then cast on a glass plate by means of a doctor blade adjusted so that the film had a wet thickness of 0.3 inch. The plate and film were dried at 25° C. overnight and were then dried at 110° C. for one hour. Following this drying, the films, now composed of polyvinyl chloride plus 33⅓% of the ester, were stripped off the plate and cut into strips ½ inch wide. Tensile strength and elongation measurements were then made on the plasticized strips. The results of these measurements are reported below in the table.

Table A

| Ester | Tensile strength | Elongation | Compatibility |
|---|---|---|---|
| | Lbs./inch² | Per cent | Per cent |
| Isomannide dibutyrate | 3,400 | 285 | 100 |
| Sorbide acetate-butyrate | 5,700 | 150 | 100 |
| Sorbide dicaproate | 2,100 | 215 | 100 |
| Sorbide dicaprylate | 2,600 | 330 | 100 |
| Sorbide caprylate-propionate | 2,400 | 170 | 100 |
| Sorbide di-2-ethyl hexoate | 3,600 | 295 | 100 |

EXAMPLE B

A stock solution was prepared of polyvinyl chloride-acetate ("Vinylite" grade "VYHH" of Carbide and Carbon Chemicals Corporation) 18.8 parts by weight in 48.2 parts cyclohexanone and 32.9 parts toluene. Tests were made by dissolving 3.13 parts of the ester to be tested in 50 parts of the stock solution. Films were cast, dried and cut into strips as in Example A. Tensile strength and elongation measurements were made on the plasticized strips which were composed of the polyvinyl chloride-acetate plus 33⅓% plasticizer. The results of these tests are also reported below in the table.

Table B

| Ester | Tensile strength | Elongation | Compatibility |
|---|---|---|---|
| | Lbs./inch² | Per cent | Per cent |
| Sorbide butyrate-acetate | 4,300 | 170 | 100 |
| Sorbide dibutyrate | 2,900 | 240 | 100 |
| Sorbide dicaproate | 2,500 | 335 | 100 |
| Sorbide dicaprylate | 2,900 | 345 | 100 |
| Sorbide caprylate-propionate | 3,100 | 335 | 100 |
| Sorbide di-2-ethyl hexoate | 3,400 | 205 | 100 |

Example C

A stock solution was prepared by dissolving 15 parts by weight of polyvinyl butyral ("Vinylite" grade "XYSG" of Carbide and Carbon Chemicals Corporation) in 85 parts of denatured ethanol (Formula #30). Tests were made by dissolving 2.5 parts by weight of the ester to be tested in 50 parts of the stock solution. Films were prepared and tested as in Example A. These films contained 33⅓% plasticizer based on the polyvinyl butyral. The results of the tests are included in the table which follows.

Table C

| Ester | Tensile strength | Elongation | Compatibility |
|---|---|---|---|
| | Lbs./inch² | Per cent | Per cent |
| Sorbide butyrate-acetate | 4,900 | 290 | 100 |
| Isomannide dibutyrate | 3,700 | 290 | 100 |
| Sorbide dicaproate | 3,300 | 280 | 75 |
| Sorbide caprylate-propionate | 4,800 | 345 | 75 |
| Sorbide di-2-ethyl butyrate | 4,500 | 310 | 100 |
| Sorbide di-2-ethyl hexoate | 4,300 | 290 | 100 |

All the esters of the invention are compatible with these vinyl resins on hot milling at 120° C.

In addition to the esters set out in the foregoing tables, which represent the preferred plasticizers for preparing elastic compositions of the respective resins, the other esters of the invention can be used with the same resins as plasticizers or softeners. For example, the hexide dipropionates and acetate-propionates are valuable as solvent-plasticizers or softeners for these resins and are 100% compatible with them. The solvent-plasticizers can also be used to advantage in conjunction with other plasticizers in the preparation of elastic compositions.

The hexide di-pelargonates have been found particularly valuable as plasticizers for vinyl resins employed in the preparation of coated fabrics.

The esters are plasticizers for synthetic rubber and impart good working properties to the rubber mix on the mill. For example, 20% by weight of isomannide dibutyrate in the butadiene-acrylonitrile copolymer produces a mass that has good working properties and when vulcanized for 40 minutes at 65 pound pressure gives a product with a tensile strength of 4200 lbs./sq. in. and an elongation of 575%.

For many uses, for example as solvents or plasticizers, mixtures of esters such as those formed from mixtures of hexides, or formed in a reaction starting with a hexitol, or formed by employing a mixture of acids, are as good as or better than pure single chemical individuals. It is unnecessary in general, therefore, to isolate specific esters or to employ reactions which produce only a single ester although pure esters can be prepared if desired.

What is claimed is:

1. Hexide diesters of the type

wherein

H is the divalent hexide residue ($C_6H_8O_4$)
R¹ is the acyl radical of a saturated fatty acid with from 2 to 9 carbon atoms,
R² is the acyl radical of a saturated fatty acid with from 3 to 10 carbon atoms, and
The sum of the carbon atoms in R¹ and R² is at least 5 and not greater than 18.

2. Sorbide diesters of the type

wherein

H is the divalent sorbide residue ($C_6H_8O_4$)
R¹ is the acyl radical of a saturated fatty acid with from 2 to 9 carbon atoms,
R² is the acyl radical of a saturated fatty acid with from 3 to 10 carbon atoms, and
The sum of the carbon atoms in R¹ and R² is at least 5 and not greater than 18.

3. Mannide diesters of the type

wherein

H is the divalent mannide residue ($C_6H_8O_4$)
R¹ is the acyl radical of a saturated fatty acid with from 2 to 9 carbon atoms,
R² is the acyl radical of a saturated fatty acid with from 3 to 10 carbon atoms, and
The sum of the carbon atoms in R¹ and R² is at least 5 and not greater than 18.

4. A hexide dioctoate.
5. A hexide di-2-ethyl hexoate.
6. A hexide dihexoate.
7. A hexide di-2-ethyl butyrate.
8. Sorbide di-2-ethyl butyrate.
9. A hexide octoate-propionate.
10. Sorbide octoate-propionate.
11. Sorbide caprylate-propionate.

SOL SOLTZBERG.